UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

DISAZO DYE AND PROCESS OF MAKING THE SAME.

1,020,670.     Specification of Letters Patent.     Patented Mar. 19, 1912.

No Drawing.     Application filed February 4, 1910. Serial No. 542,119.

*To all whom it may concern:*

Be it known that I, PAUL VOLKMANN, doctor of philosophy, chemist, citizen of the German Empire, residing at Elberfeld, Kingdom of Prussia, Germany, have invented new and useful Improvements in Disazo Dyes and Processes of Making the Same, of which the following is a specification.

My present invention relates to the manufacture and production of new azo dyestuffs which after dyeing or printing can be combined on the fiber with diazo-para-nitroanilin, producing shades varying generally from red to violet to blue.

The process for the production of the new azo dyestuffs consists in combining the diazo compounds of monoacidylized aromatic diamins, especially phenylenediamins and to luylenediamins and derivatives thereof with one molecule of 2.2-dinaphthylamin-5.5-dioxy-7.7-disulfonic acid of the formula:

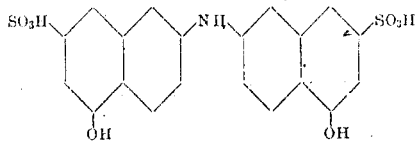

eliminating the acidyl group from the amino group of the monoazo dyes so produced, then diazotizing them and combining the resulting diazo compounds with one molecule of a naphthol compound, especially a naphthol sulfonic acid, 2.5.7-aminonaphthol sulfonic acid and a 2.5.7-aminonaphthol sulfonic acid substituted in the amino group. On dyeing or printing these dyes on cotton and combining them on the fiber with diazotized nitranilins shades generally varying from red to violet to blue are obtained which are remarkable for their fastness to washing. The shades can be discharged to a pure white by means of hydrosulfite.

The new dyes yield by reduction with stannous chlorid and hydrochloric acid a diamin, an amino-2.2-dinaphthylamin-7.7-disulfonic acid and an aminonaphthol sulfonic acid.

In order to illustrate the new process more fully, I can proceed as follows, the parts being by weight:—150 parts of para-amino-acetanilid are diazotized and the diazo compound is added to a solution of 224 parts of 1-naphthol-3-sulfonic acid in a solution of 180 parts of sodium carbonate in 2000 parts of water. The combination is complete after one hour. In order to eliminate the acetyl group concentrated caustic soda lye is added to the mixture which is then heated to 95° C. for one hour. The saponified product is then diazotized in the usual way and the resulting diazo compound is added to a solution of 505 parts of 2.2-dinaphthylamin-5.5-dioxy-7.7-disulfonic acid in 5000 parts of water containing an excess of sodium carbonate. The mixture which must be alkaline is stirred for 6 hours until the combination is finished. It is then heated to 75° C. the dye is salted out, filtered and dried.

A dye bath is prepared from 1000 parts of water, 4 parts of the above described dyestuff, 2 parts of calcined sodium carbonate and 30 parts of Glauber salt. 100 parts of cotton are entered, the bath is heated to boiling in the course of half an hour and the boiling is continued for half an hour. The goods which are dyed blue are then treated in the usual way with diazotized paranitranilin, exposed to air and rinsed. A deep blue fast to washing is thus obtained which can be discharged to a pure white with hydrosulfites. The cotton can also be padded or printed with these dyestuffs and can then be combined on the fiber with diazotized nitranilins.

The process for the manufacture of the dyestuffs is carried out in an analogous manner on using other of the above mentioned components, *e. g.* monobenzoyl-meta-phenylenediamin, monobenzoyl-meta- or para-toluenediamin, mono-oxalyl-para-phenylenediamin, 2-formylamino-4-anisidin $$(NH.COH.NH_2.OCH_3 = 1:3:6),$$

or on the other hand 1-naphthol-4- or 5-sulfonic acid, 2-phenylamino-5-naphthol-7-sulfonic acid, 2.5.7-aminonaphthol sulfonic acid or 2-acetylamino-5-naphthol-sulfonic acid, etc.

I claim:

The herein-described new azo dyestuffs, obtainable from diamins, 2.2-dinaphthylamin-5.5-dioxy-7.7-disulfo acid and azo-coupling substances which after drying and pulverizing are dark powders, soluble in water with blue color, insoluble in cold concentrated hydrochloric acid, soluble in cold sulfuric acid of 66° Bé. with greenish blue color from which solution they are precipitated as bluish flakes by the addition of water, which dyestuffs can be rediazotized on the fiber and when developed with paranitranilin produce fast shades varying from red to violet to blue, and which dyestuff can be discharged on the fiber to a pure white by means of hydrosulfite, substantially as described.

In testimony whereof I have hereunto set my hand in the presence of two subscribing witnesses.

PAUL VOLKMANN. [L. S.]

Witnesses:
OTTO KÖNIG,
CHAS. J. WRIGHT.